United States Patent [19]

Yokoyama

[11] 4,338,662

[45] Jul. 6, 1982

[54] MICROINSTRUCTION PROCESSING UNIT RESPONSIVE TO INTERRUPTION PRIORITY ORDER

[75] Inventor: Yasushi Yokoyama, Tokyo, Japan

[73] Assignee: Nippon Electric Co., Ltd., Tokyo, Japan

[21] Appl. No.: 68,709

[22] Filed: Aug. 22, 1979

[30] Foreign Application Priority Data

Aug. 22, 1978 [JP] Japan ............................ 53-102628

[51] Int. Cl.³ .............................................. G06F 9/22
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,599,162 | 8/1971 | Byrns et al. | 364/200 |
| 3,781,810 | 12/1973 | Downing | 364/200 |
| 4,017,839 | 4/1977 | Calle et al. | 364/200 |
| 4,103,328 | 7/1978 | Dalmasso | 364/200 |
| 4,103,330 | 7/1978 | Thacker | 364/200 |

OTHER PUBLICATIONS

Richard W. Watson, *Timesharing System Design Concepts*, (McGraw-Hill, 1970), Chapter 4, "Protection and Control", pp. 111-131.
IBM Corp., *A Guide to IBM System/7*, (First Edition, Oct. 1970), pp. 24-25 and preface.
Samir S. Husson, *Microprogramming Principles and Practices*, (Prentice-Hall, 1970), pp. 219-222.
Texas Instruments, Inc., *The TTL Data Book for Design Engineers*, (2nd Edition, 1976), pp. 7-151 through 7-157.
Texas Instruments, Inc., *The TTL Data Book for Design Engineers*, (1st Edition, 1973), pp. 527-528.

*Primary Examiner*—Harvey E. Springborn
*Attorney, Agent, or Firm*—Fitzpatrick, Cella, Harper & Scinto

[57] ABSTRACT

A microinstruction processing unit of the type in which microinstructions are fed and executed in a predetermined sequence to process data in a data processing system in which, upon the feeding of a higher priority microinstruction, the execution of a lower priority microinstruction is interrupted but is subsequently carried out. Microinstructions lower than the highest priority rank are supplied to control the transfer of data to and from a storage register and to and from a priority rank designated position in a register file. Upon the interruption by has higher priority ranking microinstruction, the data for an interrupted microinstruction remains in the register file but it is replaced in the storage register by data the higher priority ranking microinstruction. Signals representing the priority ranking of the interrupted microinstructions are stored in a stacking type previous level register and after an interruption, the signals from the previous level register are fed to a multiplexer to control the transfer of data from the register file to the storage register.

5 Claims, 3 Drawing Figures

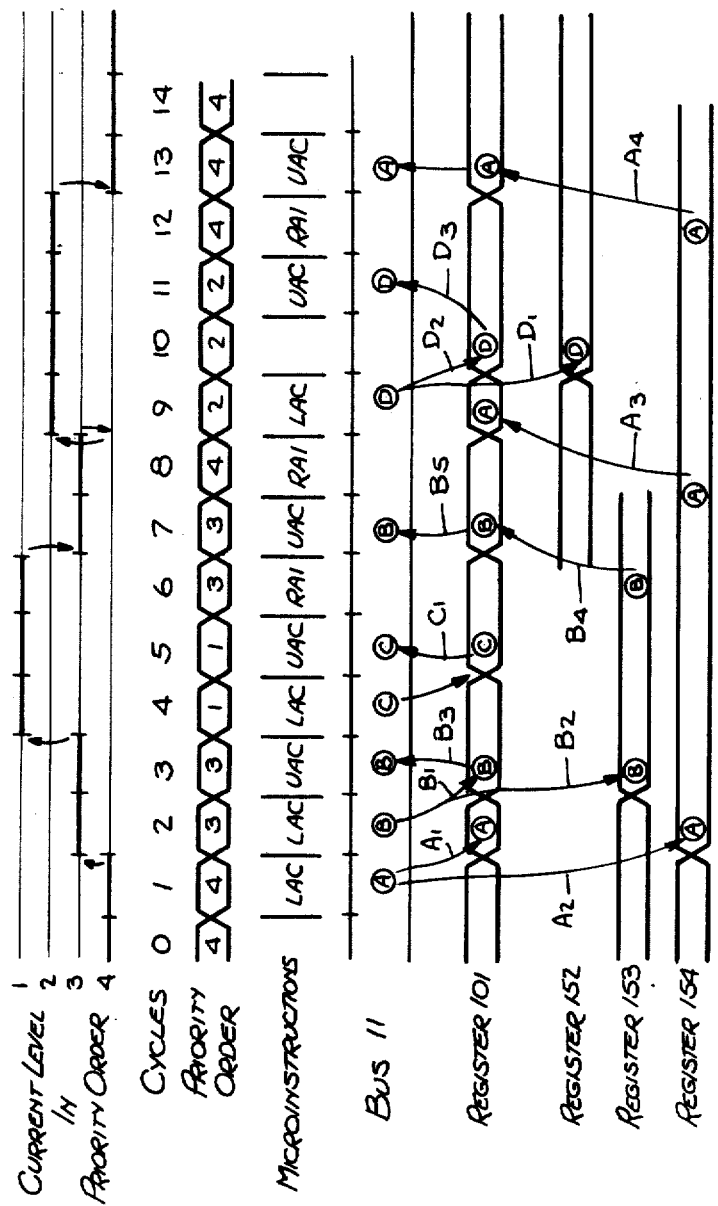

MICROINSTRUCTION PROCESSING UNIT RESPONSIVE TO INTERRUPTION PRIORITY ORDER

BACKGROUND OF THE INVENTION

1. Field of the Invention

This invention relates to a microinstruction processing unit for use in a data processing system.

2. Description of the Prior Art

Generally, in a microprogram-controlled data processing system, a microinstruction which has requested an interruption in response to an interrupt request (an interrupting microinstruction) is processed when said interrupting microinstruction is ranked higher in the priority order than the currently executed microinstruction (the present microinstruction). To enable the processing of the interrupted microprogram to be resumed after completion of the interruption processing, information needed for the resumption of said interrupted processing (including arithmetic data and results) is stored in a sheltering register at the time of interruption.

Stated in greater detail, resumption after interrupt has been achieved in the prior art using an arithmetic register which stores arithmetic data, an arithmetic circuit which operates on the data from the arithmetic register and a microinstruction processing unit (MP unit) provided with a sheltering register into which the contents of said arithmetic register can be transferred and sheltered. This MP unit is installed in the central processor unit (CPU) and performs the transfer of the contents of the arithmetic register to the sheltering register when interruption occurs.

Because the foregoing interruption processing procedure requires a considerable number of microinstruction process steps, however, some prior art systems have used an MP unit that employs a register file instead of a sheltering register. This register file functions as a storage device having a plurality of storage positions whose respective addresses correspond to the priority levels assigned to various microprograms. More specifically, the MP unit in such prior systems comprises a priority order-indicating (PO) register for storing data to assign the priority order of consecutive processing in response to a series of microinstructions; a register file for storing information (including arithmetic data and results) to be used for subsequent reprocessing of the interrupted microprogram in the assigned address based on the contents of the PO register; and an arithmetic circuit for processing information given from the register file. In an MP unit of this type, however, when the interrupting microinstruction issued in response to an interrupt request has a higher priority level than the present microinstruction, information needed to operate the contents of the PO register, depending on the priority order of the interrupting microinstruction, must be taken out of the register file. This is very time-consuming.

Moreover, it is frequently necessary to check the processing results of the interrupted microprogram obtained immediately before the interruption. However, all that can be read out of the register files of such MP unit systems is address information for reprocessing corresponding to the priority order of the present microinstruction. Consequently, in order to achieve the required error checking, the contents of the PO register must be rewritten and the addresses of the register file must be converted into addresses useful for taking error checking information out of the register file. This results in a substantial increase in the number of microinstruction steps. An MP unit of this type is described by International Business Machine Corporation in "A Guide to the IBM System/7", 1970, pp. 24-25.

It is therefore an object of the present invention to provide a microinstruction processing unit responsive to interruption priority order which is free from the above-described and other disadvantages of conventional units.

SUMMARY OF THE INVENTION

The present invention provides a novel microinstruction processing unit of the type in which priority ranked microinstructions, including, load accumulator instructions, unload accumulator instructions, arithmetic instructions and return-after-interruption instructions, are fed and executed in a predetermined sequence to process data in a data processing system. By "priority ranked" it is meant that the microinstructions each have priority rank characteristic such that, upon the feeding of an interrupting microinstruction of a higher priority rank, the execution of a previously fed microinstruction of a lower priority rank will be interrupted.

The novel microinstruction processing unit of the present invention comprises a microprogram control storage for storing microinstructions to be fed in a predetermined sequence. It also comprises a storage register, a register file, a priority decoder, a current level register, a previous level register and a multiplexer.

The storage register is connected and arranged to perform the following operations:

(A) to receive and store data from an external data bus in response to the feeding of each load accumulator instruction;

(B) to feed data to an external data bus in response to the feeding of each unload accumulator instruction;

(C) to feed data to and to receive data from the arithmetic circuit in response to the feeding of each arithmetic instruction; and (D) to receive data from the register file in response to the feeding of each return-after-interruption instruction.

The register file has a plurality of data storage positions each of which represents a different microinstruction priority rank. The register file is connected and arranged to perform the following operations:

(A) to receive and store data from the external data bus in response to the feeding of each load accumulator instruction which is lower than the highest priority rank;

(B) to store such data in storage position corresponding to the priority rank of such load accumulator instruction; and (C) to feed data from one of said storage positions to said storage register in response to the feeding of a return-after-interruption instruction.

The priority decoder is constructed and arranged to produce signals representative of the priority rank of each microinstruction and each interrupting microinstruction as it is fed.

The current level register is arranged to store signals from the priority decoder.

The previous level register is of the stacking type; and it is connected and arranged to receive, upon the feeding of a microinstruction of higher priority rank which interrupts a microinstruction of lower priority rank, the signals previously stored in the current level register.

The multiplexer is associated with the register file and it is connected and arranged to select, according to the signals in the previous level register, and upon the occurence of a return-after-interruption instruction, the data storage position in the register file from which data is fed to the storage register.

With this arrangement each microinstruction, as it is fed, is inserted into both the storage register and into a particular location in the register file corresponding to the priority rank of the microinstruction, unless it has the highest priority rank, in which case it is directed only into the storage register but not into the register file. Also, the rank of each microinstruction, as it is fed, is decoded by the priority decoder and the resulting signals are inserted into the current level register. When an interrupting microinstruction, i.e. one of higher priority rank than a previously fed microinstruction, occurs, it interrupts the execution of the previously fed microinstruction and it directs new data into the storage register. Also, if the interrupting microinstruction is lower then the highest priority rank, it will also direct the new data into the appropriate position of the register file. In addition, the priority decoder decodes the priority rank of the interrupting microinstruction and inserts the resulting signal into the current level register while the signal previously in that register is transferred to the previous level register. Upon completion of execution of the interrupting microinstruction a return-after-interruption instruction is generated and this causes the multiplexer to control the transfer path from the register file so that the interrupted microinstruction will be returned to the storage register for execution.

BRIEF DESCRIPTION OF THE DRAWINGS

The advantages of the present invention will be apparent from the following more detailed description of a preferred embodiment of the invention, employing a four level priority interrupt system as illustrated in the accompanying drawings in which:

FIG. 3 is a timing diagram illustrating the operation of the microprogram control unit and execution unit of FIG. 2.

DETAILED DESCRIPTION OF THE PREFERRED EMBODIMENT

Figure 1:
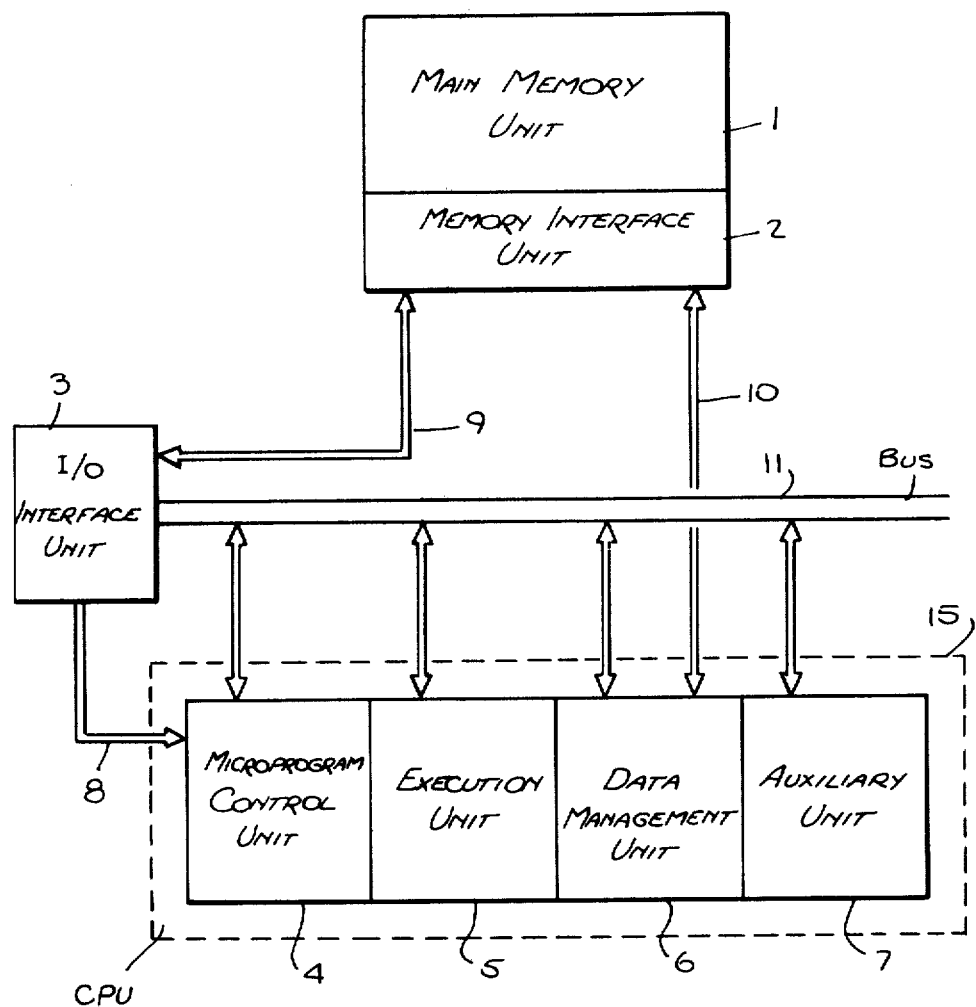
FIG. 1 is a block diagram illustrating a data processing system, including a microprogram control unit and an execution unit in which the present invention is embodied.

Referring to FIG. 1, a data processing system includes a main memory unit 1, a memory interface unit 2 electrically connected to the unit 1; an input/output (I/O) interface unit 3 electrically connected to the memory interface unit 2 through an I/O-memory interface 9, and a central processor unit (CPU) 15. This central processor unit 15 comprises a microprogram control unit 4, an execution unit 5, a data management unit 6 and an auxilliary unit 7. The microprogram control unit 4 is electrically connected to the I/O interface unit 3 through an interrupt request line 8 and a common data bus 11. The execution unit 5 is electrically connected to the common bus 11. The data management unit 6 is electrically connected to the memory interface unit 2 through a memory buffer interface 10 and to the other units 3, 4, 5 and 7 through the common bus 11. Further, the auxiliary unit 7 is electrically connected to the other units 3, 4, 5 and 6 through the common bus 11.

Figure 2:
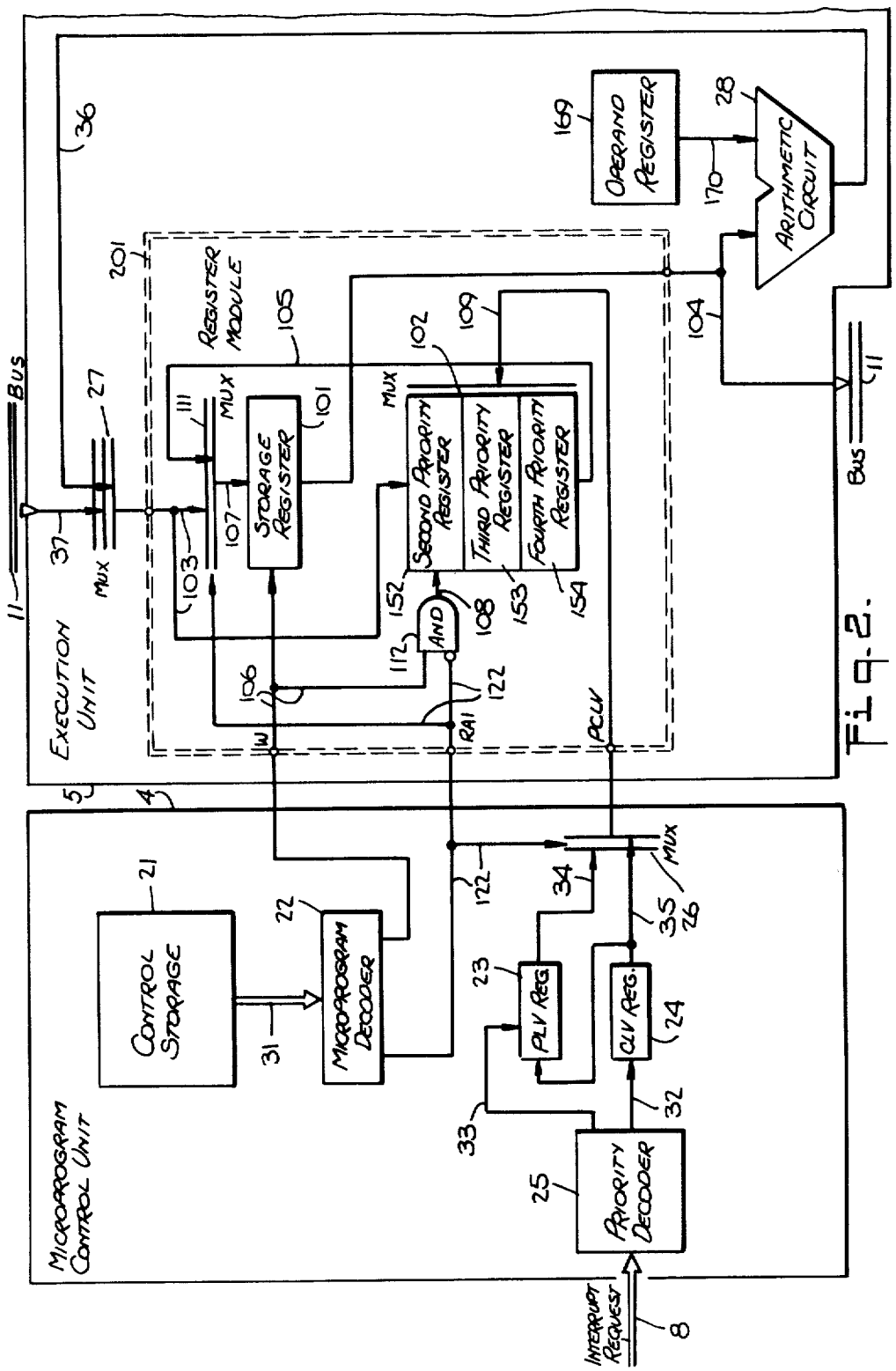
FIG. 2 is a further block diagram illustrating in detail novel arrangements used in the microprogram control unit and the execution unit of FIG. 1.

Referring further to FIG. 2, the embodiment of this invention includes in the execution unit 5, a register module 201 and an arithmetic circuit 28. Also, the microprogram control unit 4 is shown as having a control storage 21 and a microprogram decoder 22. The arithmetic circuit 28 is supplied with data for calculation from the register module 201 and an operand register 169 installed in the execution unit 5 through signal lines 104 and 170, respectively. For details of the control storage 21 and the microprogram decoder 22 in the unit 4, reference is made to an article by Samir S. Husson, entitled "Microprogramming the IBM System/360, Model 40", in MICROPROGRAMMING; Principles and Practices, pp. 220-221, published in 1979 by Prentice-Hall, Inc.

Microinstructions stored in the control storage 21 are fed, in a predetermined sequence, to the microprogram decoder 22 by way of a signal line 31 and decoded therein. The decoded results are supplied to signal lines 106 and 122. A write-in (W) signal and a return-after-interruption (RAI) signal are supplied to the register module 201 through signal lines 106 and 122, respectively. The RAI signal, which is the decoded result of one of the microinstructions, is a signal calling for a return to the interrupted microprogram upon completion of the interruption processing.

The microprogram control unit 4 also includes a priority decoder 25 which is supplied with an interruption request signal supplied via an interrupt request line 8 from the I/O interface unit 3 shown in FIG. 1. The decoder 25 may comprise a priority encoder of the type described in The TTL Data Book for Design Engineers, pp. 7-152, published in 1976 by Texas Instruments, Inc.

If the interruption request signal from line 8 given to the priority decoder 25 is ranked in priority above the present microinstruction (hereinafter called "instruction"), a value indicating the priority rank of the interrupting microprogram is stored in a current level register (CVL REG) 24 through a signal line 32, and the previous value of CVL REG 24 is then stored in a previous level register (PVL REG) 23 which has a stacking structure. A multiplexer (MUX) 26 in the microprogram control unit 4 selects the output of the current level register (CLV REG) 24 when the return-after-interruption (RAI) signal from the decoder 22 is "0", and the MUX 26 selects the output of the previous level register (PVL REG) 23 when the RAI signal from the decoder 22 is "1". The outputs from the MUX 26 are supplied to the register module 201 as previous/current level (PCLV) electrical signals. The multiplexer 26 may be comprised of a multiplexer of the type referred to in The TTL Data Book for Design Engineers, pp. 527-528, published in 1973 by Texas Instruments.

The register module 201 is supplied with data from the common data bus 11 through a signal line 37 and a multiplexer 27. The register module 201 also supplies data to the common bus 11 via a signal line 104. Data fed through a signal line 103 is selected by a multiplexer 111 in response to the return-after-interruption (RAI) signal 122, and is stored in a storage register 101. This storing operation takes place in synchronism with the write-in (W) signal 106. Data stored in the register 101 is also fed to the signal line 104. Data fed through signal line 103 is also supplied to a register file 102 under control of AND gate 112.

The register file 102 comprises second priority, third priority and fourth priority registers 152, 153, and 154, to which the lowest three of the four priority levels are assigned. The register 101 is assigned the highest among these four priority levels. Information supplied to register file 102 by way of signal line 103 is stored in response to a write-in signal on a write-in signal line 106, and is written into the particular register of register file 102 which is designated by means of the PCLV signal from line 109. Also, stored information is fed to a signal line 105 from the register in register file 102 designated by means of the PCLV signal line 109.

The operation of the embodiment of FIG. 2 will be described in further detail below in relation to various exemplary machine cycles of the data processing system and the relationship between the four priority levels of the processing and the contents of the registers can be seen for each of these machine cycles in the timing diagram of FIG. 3. First-level priority is designated as the highest priority level.

Cycle 1

In this cycle, it is assumed that a fourth-level (i.e. lowest) priority "load accumulator" or LAC instruction (i.e. an instruction to store data from the common bus 11 into the register module 201) is to be performed. As soon as this instruction is given from the control storage 21 through the signal line 31 to the decoder 22 and decoded, a return-after-interruption (RAI) electrical signal which has a logic "0" value is supplied to signal line 122, and a write-in (W) electrical signal, which has a logic "1" value, is simultaneously supplied to the signal line 106. As a result, AND gate 112 is opened, and the write-in signal from the decoder 22 is fed from the signal line 106 both to the register 101 and to the register file 102. Since, at this time point, a logic "0" value is supplied to the multiplexer 111 through a signal line 122, the multiplexer 111 selects data fed from the common bus 11 through the signal line 103 for storage into the register 101 under control of signal line 107. This is illustrated as A→A1→A at time cycle 1 in FIG. 3. Meanwhile, because the return-after-interruption (RAI) signal given through the signal line 122 has a logic "0" value, the multiplexer 26 selects the electrical signal indicating fourth-level priority from the current level register (CLV REG) 24 through a signal line 35, and feeds it to the PCLV signal line 109. As a result, the register 154 is designated as the address at which to store data simultaneously coming from the common bus 11 to register file 102. This is illustrated as A→A2→A in FIG. 3.

Cycle 2

If the execution of the LAC instruction having the fourth-level priority is interrupted in Cycle 1 by an LAC instruction having a third-level priority (i.e., higher in priority ranking than the interrupted instruction), the third-ranked LAC instruction is executed after data from the common bus 11 is stored in the register 101 and register 154 in Cycle 1. This execution of the third-level priority LAC instruction results in processing similar to that of the fourth-level priority LAC instruction referred to in Cycle 1, so that data from the common bus 11 will be stored in the register 101 and register 153. (The assigned third-priority level register) as illustrated by B→B1→B and B→B2→B in FIG. 3.

(Second-, third-, and fourth-level LAC instructions will write data into both register 101 and the register of file 102 that corresponds to the respective priority level. Thus, the registers in file 102 always maintain the value of the latest contents of register 101 for other than first-level priority instructions.)

Cycle 3

An "unload accumulator" or UAC instruction (instruction to feed the contents stored in the register module 201 to the common bus 11) is carried out to give the contents stored in the register 101 to the common bus 11 through signal line 104. This is illustrated as B→B3→B in FIG. 3. If the execution of the third-level priority UAC instruction is also interrupted, as by a first-level (highest) LAC instruction, the interrupting instruction is carried out in the following described cycle.

Cycle 4

In response to a first-level LAC instruction (i.e. one having the highest priority order), data from the common bus 11 is stored only in the register 101 but not in the register file 102. Because the highest-level instructions will always be carried out first and such processing cannot be interrupted by a lower-level instruction, there is no necessity for simultaneous writing into the register file 102. The previous contents of register 101 are overwritten, but the contents which were stored in the registers 153 and 154 (as shown by B→B2→B and A→A2→A in FIG. 3) responsive to the third-level and fourth-level priority instructions, respectively, are held for future use, unaffected by the first-level priority interrupt.

Cycle 5

In this cycle a first-level priority UAC instruction is executed with the result that the contents stored in the register 101 are fed to the common bus 11 through the signal line 104 as illustrated at C→C1→C in FIG. 3.

Cycle 6

In this cycle a return-after-interruption (RAI) instruction having the highest priority order is executed to order a return to the interrupted instruction. When the RAI instruction is decoded by the decoder 22, the electrical RAI signal on the signal line 122 becomes a logic "1", and a write-in signal (W) to the register module 201 is supplied to the signal line 106. First, because the signal line 122 has a logic "1" value the multiplexer 26 selects the contents of the previous level register (PLV REG) 23 (i.e. a value indicating the third-level rank in the priority order) and feeds it to the signal line 109 to assign the register 153 in the register file 102. Second, since the return-after-interruption (RAI) signal given through the signal line 122 has a logic "1" value, no write-in signal (W) is fed to the write-in signal line 108 through the AND gate 112. As a result, data in the register 153 is supplied to the multiplexer 111 through the signal line 105. Since the multiplexer 111 has been given a logic "1" value as its selection command signal through the signal line 122, and since the register 101 is enabled by the RAI signal through the signal line 106, data fed through the signal line 105 is selected and is stored in the register 101 through the signal line 107. Thus, the completion of interrupt processing of a certain priority level triggers an RAI signal that automatically restores the contents of register 101 to what they were before the last interrupt occurred. (The previous level register stacks the values of priority levels of the interrupted processes, so that return is to processing of the last highest interrupted level.)

Cycle 7

In this cycle a third-level priority "unload accumulator" or UAC signal occurs immediately after execution of the return-after-instruction (RAI) signal in Cycle 6. Because the contents of the register 153 are automatically restored into the register 101 in Cycle 6 (as illustrated by B→B4→B in FIG. 3), a UAC instruction in Cycle 7 immediately after the execution of the RAI microinstruction in Cycle 6 causes the contents stored in the register 101 to be fed to the common bus 11 through the signal line 104.

Cycle 8

In this cycle a return-after-interruption (RAI) instruction is executed upon completion of the operation of a group of instructions ranked third in the priority order. This results in a repetition of the same operations to resume the fourth-level priority process which was interrupted by the third-level process, as took place in cycle 6 to resume the third-level priority process which was interrupted by the first-level process. At this point in time, the RAI electrical signal from the decoder 22 attains a logic "1" value, which sets the multiplexer (MUX) 26 to send a PCLV signal value indicating the fourth-level priority rank through signal line 109 from the previous level register (PLV REG) 23 to designate register 154 of file 102. Simultaneously, the RAI signal value of "1" disables AND gate 112 to inhibit write-in to file 102 and sets multiplexer 111 to take input from file 102 over signal line 105. As a result, data supplied from the register 154 is delivered through the signal line 105, the multiplexer 111 and the signal line 107 and is restored into the register 101 as shown by A→A3→A in FIG. 3. Register 101 now has the contents it had before the interrupt at cycle 2.

Cycle 9

In this cycle, an interruption by a second-level priority ranked LAC instruction (having a higher priority order than the fourth priority order) is generated. As a result, a value equal to the second-level priority is stored in the current level register (CLV REG) 24 and is selected by the multiplexer 26 to be sent to signal line 109. Thus, the register 152 (assigned to second-level priority) is designated by an electrical PCLV signal given through the signal line 109. Data from the common bus 11 is stored in the register 152 (as shown by D→D1→D in FIG. 3) and the same data is simultaneously stored in the register 101 (as shown by D→D2→D in FIG. 3). Therefore, the data stored in the register 101 in Cycle 8 for use in the execution of an instruction ranked fourth in the priority order is overwritten and disappears from the register 101.

Cycle 10

In this cycle an arbitrary instruction (other than an LAC, UAC, or RAI instruction), such as an arithmetic instruction, is carried out.

Cycle 11

In this cycle a second-level priority UAC instruction is executed to supply the contents of the register 101, through line 104, to the bus 11 as illustrated by D→D3→D in FIG. 3.

Cycle 12

In this cycle, in response to an RAI instruction, a fourth-ranked priority value stored in the previous level register (PLV REG) 23 is selected by the multiplexer 26. The RAI instruction is generated because the processing of a group of instructions of second-level priority order was completed in Cycle 11. In such case, the contents of the register 154 are restored into the register 101 through the signal line 105, the multiplexer 111, and the signal line 107 in response to PCLV, signal given through the signal line 105. This is illustrated as A→A4→A in FIG. 3.

Cycles 13 and 14

Processing of the fourth-level priority instructions is continued until completed, unless another higher priority level interrupt occurs.

A microinstruction processing unit constructed in accordance with the present invention saves a significant amount of time over conventional units during priority level responsive interrupt processing. It will be appreciated that with the present invention the assignment of storage positions may be dispensed with because data are always read out of a specified register 101. Moreover, because no sheltering operation of data is needed to resume the execution of any interrupted instruction, greater operational margin can be taken for other operations that must be effected within the same machine cycle.

What is claimed is:

1. A microinstruction processing unit of the type in which microinstructions are fed and executed in a predetermined sequence to process data in a data processing system, said microinstructions having various priority ranks such that, upon the feeding of an interrupting microinstruction of a higher priority rank, the execution of a previously fed microinstruction of lower priority rank will be interrupted, said microinstructions including load accumulator instructions, unload accumulator instructions, arithmetic instructions and return-after-interruption instructions, said microinstruction processing unit comprising:

a microprogram control storage for storing microinstructions to be fed in said predetermined sequence, a storage register, a register file and an arithmetic circuit, control means connected to said storage register for causing the receiving and storing of data from an external data bus in response to the feeding of each load accumulator instruction, for causing the feeding of data to an external data bus in response to the feeding of each unload accumulator instruction, for causing the feeding of data and the receiving of data from said arithmetic circuit in response to the feeding of each arithmetic instruction and for receiving data from said register file in response to the feeding of each return-after-interruption instruction, said register file having a plurality of data storage positions, each said position representing a different priority rank, said register file being connected and arranged to receive and store data from said external data bus in response to the feeding of each load accumulator instruction which is lower than the highest priority rank and to store such data in a storage position corresponding to the priority rank of such load accumulator instruction, said register file further being connected and arranged to feed data from one of said storage positions to said storage register in response to the feeding of a return-after-interruption instruction, a priority decoder for producing signals representative of the priority rank of each microinstruction and each interrupting microinstruction as it is fed, a current level register for storing signals from said priority decoder, a previous level register, of the stacking type, connected and arranged to receive, upon the feeding of a microinstruction of higher priority rank which interrupts a microinstruction of lower priority rank, the signals previously stored in said current level register, and a multiplexer associated with said register file and connected and arranged to select, according to the signals in said previous level register, and upon the occurrence of a return-after-interruption instruction, the data storage position in said register file from which data is fed to said storage register.

2. A miscroinstruction processing unit according to claim 1 wherein said multiplexer is further arranged to select, according to the signals in said current level register, and upon the occurence of a load accumulator instruction, the data storage position in said register file into which data is fed from said external bus.

3. A microinstruction processing unit according to claim 2 wherein there is provided a second multiplexer connected to receive signals from said current level register and said previous level register for directing said signals alternately to control the operation of the multiplexer associated with said register file, said second multiplexer being arranged to respond to a return-after-interruption instruction to direct signals from said previous level register to said multiplexer associated with said register file.

4. A microinstruction processing unit according to claim 3 wherein there is provided a third multiplexer connected to receive signals from said register file and from said data bus for directing said data alternately to said storage register, said third multiplexer being arranged to respond to a return-after-interruption instruction to direct signals from said register file to said storage register.

5. A microinstruction processing unit according to claim 4 further including a gate connected to receive return-after-interruption instructions and, in response thereto, to prevent data from being loaded into said register file.

* * * * *

UNITED STATES PATENT AND TRADEMARK OFFICE
CERTIFICATE OF CORRECTION

PATENT NO. : 4,338,662
DATED : July 6, 1982
INVENTOR(S) : Yasushi Yokoyama

It is certified that error appears in the above-identified patent and that said Letters Patent is hereby corrected as shown below:

Cover page, [57] ABSTRACT, line 11, "has" to read -- the --;

line 14, after "data" insert -- for --

*Signed and Sealed this*

*Fourteenth* Day of *September 1982*

[SEAL]

*Attest:*

*Attesting Officer*

GERALD J. MOSSINGHOFF

*Commissioner of Patents and Trademarks*